United States Patent
Ye et al.

(10) Patent No.: US 7,520,181 B2
(45) Date of Patent: Apr. 21, 2009

(54) APPARATUS FOR MEASURING AIRFLOW GENERATED BY COMPUTER FAN

(75) Inventors: Zhen-Xing Ye, Shenzhen (CN); Ke Sun, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 33 days.

(21) Appl. No.: 11/741,747

(22) Filed: Apr. 29, 2007

(65) Prior Publication Data

US 2008/0150738 A1    Jun. 26, 2008

(30) Foreign Application Priority Data

Dec. 22, 2006    (CN) .......................... 2006 1 0201373

(51) Int. Cl.
*G01P 5/06* (2006.01)
(52) U.S. Cl. .................................................. 73/861.85
(58) Field of Classification Search .............. 73/861.85; 62/180
See application file for complete search history.

(56) References Cited

U.S. PATENT DOCUMENTS

| | | | | |
|---|---|---|---|---|
| 5,710,380 | A | * | 1/1998 | Talley et al. .............. 73/861.85 |
| 7,096,147 | B1 | * | 8/2006 | Low .......................... 702/132 |
| 2004/0031331 | A1 | * | 2/2004 | Blakley et al. ........... 73/862.52 |
| 2005/0150310 | A1 | * | 7/2005 | Beversdorf ............... 73/861.85 |
| 2005/0187664 | A1 | * | 8/2005 | Bash et al. ................... 700/276 |
| 2005/0267639 | A1 | * | 12/2005 | Sharma et al. .............. 700/276 |
| 2006/0121421 | A1 | * | 6/2006 | Spitaels et al. .............. 434/118 |
| 2006/0168975 | A1 | * | 8/2006 | Malone et al. ................ 62/180 |

* cited by examiner

*Primary Examiner*—Andre J Allen
(74) *Attorney, Agent, or Firm*—Frank R. Niranjan

(57) ABSTRACT

An exemplary apparatus for measuring airflow speed of a computer system fan includes an air guide sleeve having one end configured for connecting to an air outlet of the computer fan for guiding the airflow of the computer fan therethrough; a fixed loop connected to another end of the air guide sleeve for the airflow guided by the air guide sleeve passing therethrough; and a plurality of anemometers adjustably mounted to the fixed loop and extending into a central through hole of the fixed loop to determine airflow speed information. The apparatus is used to measure the airflow of the computer system fan by being positioned at an exit of the computer fan for expediently evaluating fan performance.

13 Claims, 3 Drawing Sheets

APPARATUS FOR MEASURING AIRFLOW GENERATED BY COMPUTER FAN

BACKGROUND OF THE INVENTION

1. Field of the Invention

The present invention relates to computer fan test apparatuses, and particularly to an apparatus for measuring airflow generated by a computer fan.

2. Description of Related Art

Any electrical component that has current flowing through it produces heat, and computers are no exception. Heat in a computer system may be tolerable to some degree, but excess heat must be removed from the system to allow the electronic components to function properly. The response to the need to remove the heat from a computer system has in large part been the use of computer fans.

In the early days of computer technology, when central processing unit (CPU) speeds were low, a small fan in a computer running at a relatively low speed was sufficient to remove excess heat from the computer system. However, as computer system technology advances and microprocessor speeds increase, more heat is generated within a computer system that must be removed. Computer system designers have resorted to increasing the number, speed, and size of fans used in the computers.

However, even though it is known that larger fans or higher-speed fans may generate more airflow, computer system designers should measure the airflow the fans to ensure the increase in airflow is enough.

Therefore, a test apparatus for measuring airflow of a computer fan is needed.

SUMMARY OF THE INVENTION

An exemplary apparatus for measuring airflow speed of a computer fan includes an air guide sleeve having one end configured for connecting to an air outlet of the computer fan for guiding the airflow of the computer fan therethrough; a fixed loop connected to another end of the air guide sleeve for the airflow guided by the air guide sleeve passing therethrough; and a plurality of anemometers adjustably mounted to the fixed loop and extending into a central through hole of the fixed loop to determine airflow speed information.

Other advantages and novel features will become more apparent from the following detailed description when taken in conjunction with the accompanying drawings, in which:

DETAILED DESCRIPTION OF THE INVENTION

Figure 1:
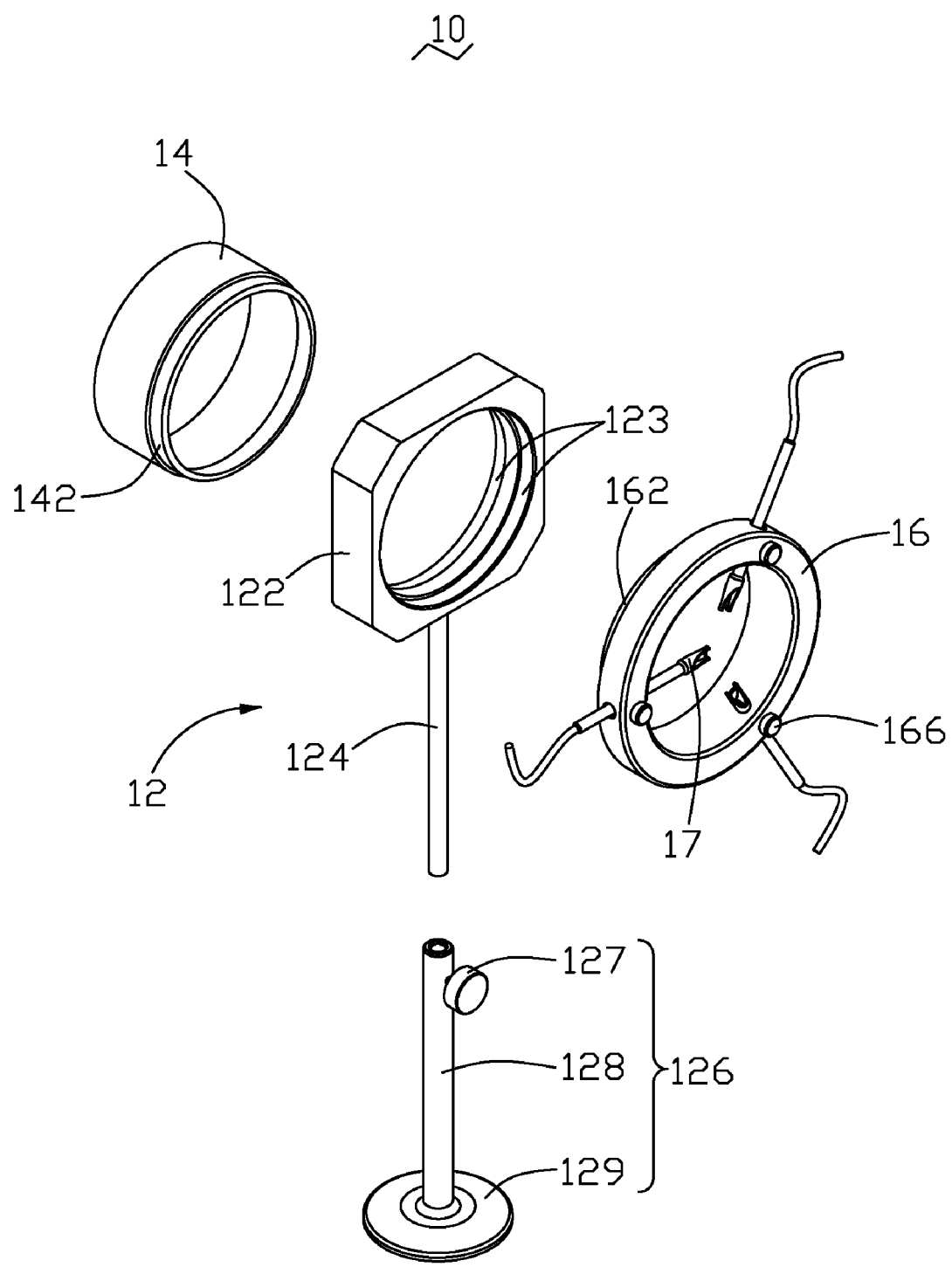
FIG. 1 is an exploded, isometric view of one embodiment of an apparatus for measuring airflow of a computer fan in accordance with the present invention.
Figure 2:
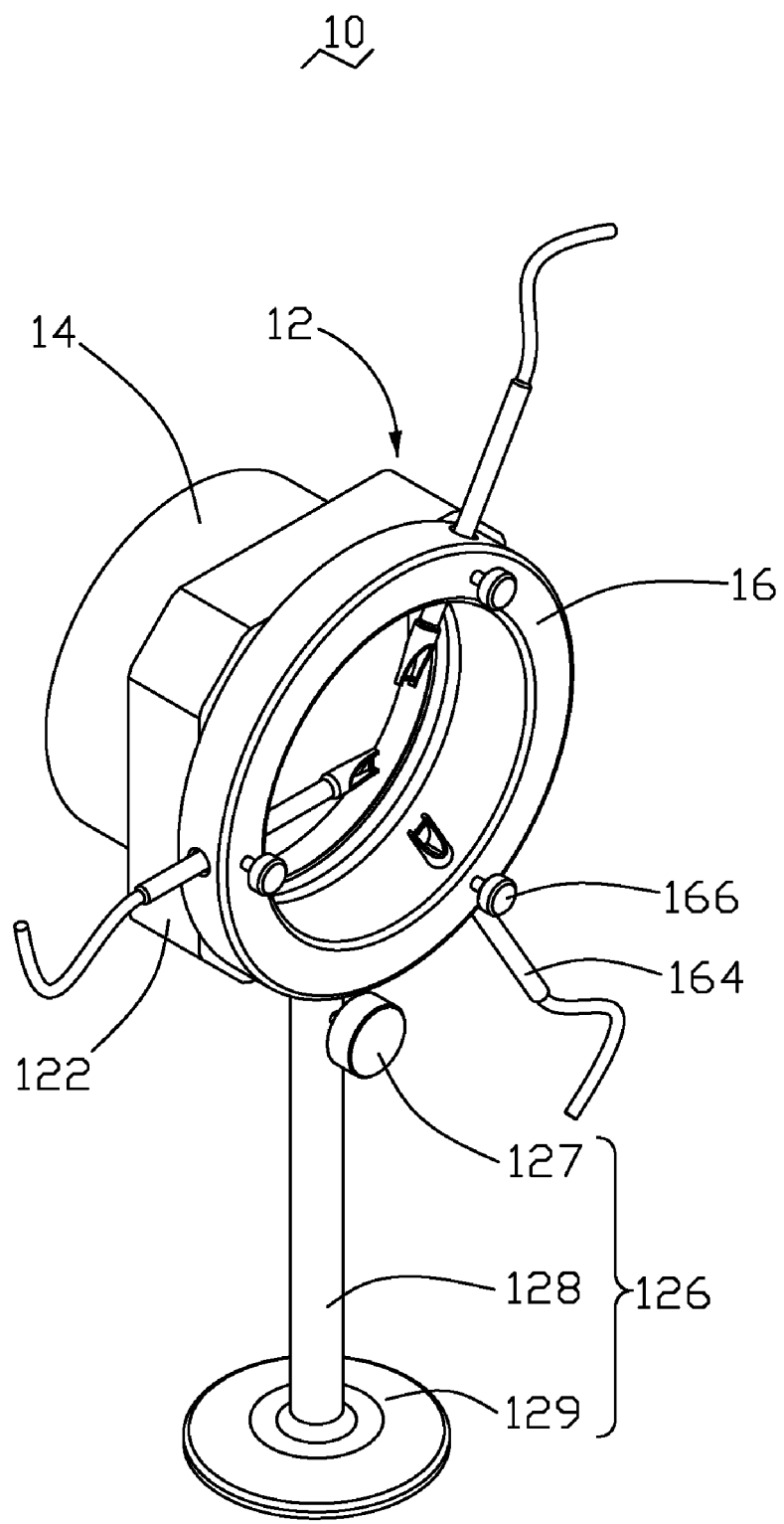
FIG. 2 is an assembled view of FIG. 1.

Referring to FIG. 1 and FIG. 2, an apparatus 10 in accordance with a preferred embodiment of the present invention includes a support module 12, an air guide sleeve 14, and a fixed loop 16. The support module 12 includes a bracket 122 with a staff 124 extending down from the bottom thereof, and a base module 126 including a base plate 129, a pole 128 extending up from the base plate 129 with a hole for accepting the staff 124 and an adjustment screw 127 for fastening the staff 124 inserted in the hole of the pole 128.

The bracket 122, the air guide sleeve 14, and the fixed loop 16 each define a through hole in a center thereof. Three hot-wire anemometers 17 are evenly arranged at the fixed loop 16 and jut into the through hole thereof through three corresponding bores. Two annular engaging portions 123, such as are defined in two opposite ends the inner circumferential surface of the through hole of the bracket 122. The air guide sleeve 14 is fixed to one end of the bracket 122 via an engaging portion 142 thereof secured in one of the engaging portions 123 of the bracket 122. The fixed loop 16 is fixed to another end of the bracket 122 via an engaging portion 162 thereof secured in the other one of the engaging portions 123 of the bracket 122. The fixed loop 16 further includes three screws 166 for adjustably locking the hot-wire anemometers 17 in the bores of the fixed loop 16 respectively. Positions of the hot-wire anemometers 17 in the bores of the fixed loop 16 can be adjusted to measure wind speeds at different positions.

The air guide sleeve 14 is attached to an air outlet of a fan in a computer system. When the fan is operating, the air guide sleeve 14 guides airflow generated by the fan through the through holes of the air guide sleeve 14, the bracket 122, and the fixed loop 16. Airflow speed can be measured by the hot-wire anemometers 17. The quantity of airflow discharged from the fan is found using the following equation: $Q=S*((V1+V2+V3)/3)$, wherein Q is the quantity of airflow, S is the area of the though hole of the fixed loop 16, V1~V3 are wind speeds measured by the three hot-wire anemometers 17. Therefore, the apparatus 10 is used to measure airflow of the fan for showing whether the fan is suitable to the computer system.

Figure 3:
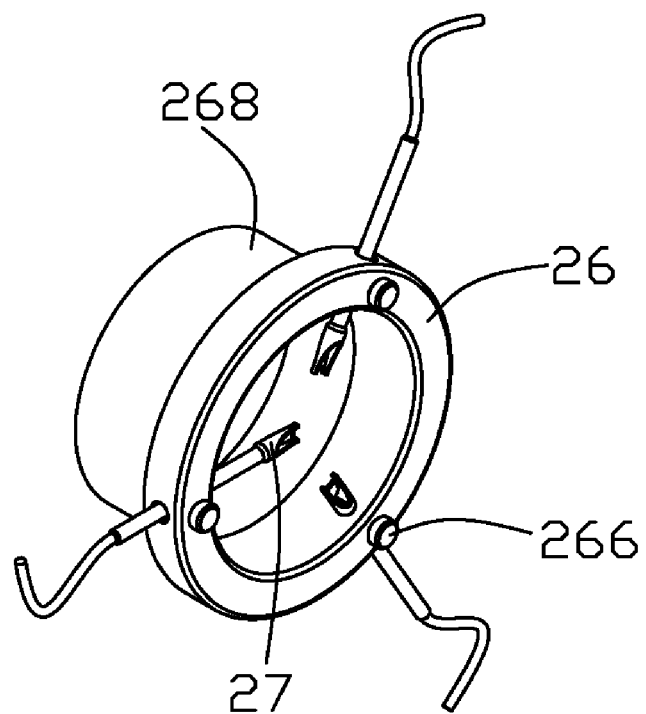
FIG. 3 is an isometric view of another embodiment of the present invention.

Referring to FIG. 3, in another embodiment of the present invention, an apparatus 20 includes a fixed loop 26 defining a through hole in a center thereof. Three hot-wire anemometers 27 are evenly arranged at the fixed loop 26 and jut into the through hole thereof through corresponding bores, and three screws 266 adjustably lock the hot-wire anemometers 27 in the bores of the fixed loop 16 respectively. An air guide sleeve 268 extends out from one end of the fixed loop 26 at an edge of the though hole for guiding airflow generated by the fan through the through hole of the fixed loop 16. A distal end of the air guide sleeve 268 is mounted to an air outlet of the fan by conventional means, such as by glue or by attaching magnetic material to the distal end.

The foregoing description of the exemplary embodiments of the invention has been presented only for the purposes of illustration and description and is not intended to be exhaustive or to limit the invention to the precise forms disclosed. Many modifications and variations are possible in light of the above teaching. The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. An apparatus for measuring airflow speed of a computer fan, comprising:

an air guide sleeve having one end configured for connecting to an air outlet of the computer fan for guiding the airflow of the computer fan therethrough;

a fixed loop connected to another end of the air guide sleeve and having a through hole in a center thereof and configured for guiding the airflow guided by the air guide sleeve passing therethrough; and a plurality of anemometers adjustably mounted to the fixed loop and extending into the central through hole of the fixed loop to determine airflow speed information, wherein a plurality of fixing means is configured for mounting the plurality of anemometers to the fixed loop, each of anemometers is slidable in the corresponding fixing means, and thereby capable of independently adjusting extending depth in the central through hole of the fixed loop.

2. The apparatus as claimed in claim 1, wherein the plurality of fixing means comprises a plurality of bores defined in the fixed loop in a radial direction for the anemometers extending therethrough.

3. The apparatus as claimed in claim 2, wherein the plurality of fixing means further comprises a plurality of screws corresponding to the plurality of bores engages in the fixed loop in an axial direction thereof to fasten the anemometers in the bores, when the screws are disengaged from the anemometers the anemometers are movable inward or outward along the bores to adjust positions of to anemometers in die central through hole of the fixed loop.

4. The apparatus as claimed in claim 1, wherein the anemometers are hot-wire anemometers.

5. The apparatus as claimed in claim 1, wherein the anemometers are evenly arranged in the fixed loop in a circumferential direction thereof.

6. An apparatus for measuring airflow speed of a fan within a computer, comprising:

an air guide sleeve defining a through hole in a center thereof and having one end configured for connecting to an air outlet of the computer fan for guiding the airflow of the computer fan therethrough;

a support module defining a through hole in a center thereof and configured for supporting the apparatus outside of the computer, the support module having an end connected to another end of the air guide sleeve;

a fixed loop connected to another end of to support module and having a through hole configured for the airflow guided by the air guide sleeve passing therethrough; and a plurality of hot-wire anemometers adjustably mounted to the fixed loop and extending into the through hole of the fixed loop to determine airflow speed information, wherein a plurality of fixing means is configured for mounting the plurality of anemometers to the fixed loop, each of the anemometers is slidable in the corresponding fixing means, and thereby capable of independently adjusting extending depth in the central through hole of the fixed loop.

7. The apparatus as claimed in claim 6, wherein the support module includes a bracket with a staff extending down from a bottom thereof, and a base module with a base plate, a pole extending up from the base plate and defining a hole for receiving the staff, and an adjustment screw for adjustably fastening the staff inserted in the hole of the pole.

8. The apparatus as claimed in claim 7, wherein the air guide sleeve and the fixed loop are fixed on two opposite sides of the bracket.

9. The apparatus as claimed in claim 6, wherein the plurality of fixing means comprises a plurality of bores defined in the fixed loop in a radial direction for the anemometers extending therethrough.

10. The apparatus as claimed in claim 9, wherein the plurality of fixing means further comprises a plurality of screws corresponding to the plurality of bores engages in the fixed loop in an axial direction thereof to fasten the anemometers in the bores, when the screws are disengaged from the anemometers the anemometers are movable inward or outward along the bores to adjust positions of the anemometers in the central through hole of the fixed loop.

11. The apparatus as claimed in claim 8, wherein two annular engaging portions are defined in two opposite ends the inner circumferential surface of the through hole of the bracket, the air guide sleeve is fixed to one end of the bracket via an engaging portion thereof secured in one of the annular engaging portions of the bracket, and the fixed loop is fixed to another end of the bracket via an engaging portion thereof secured in the other one of the annular engaging portions of the bracket.

12. The apparatus as claimed in claim 6, wherein the anemometers are evenly arranged in the fixed loop in a circumferential direction thereof.

13. An apparatus for measuring airflow speed of a computer fan, comprising:

an air guide sleeve having one end configured for connecting to an air outlet of the computer fan for guiding the airflow of the computer fan therethrough;

a fixed loop connected to another end of the air guide sleeve and having a central through hole configured for the airflow guided by the air guide sleeve passing therethrough; and a plurality of anemometers adjustably mounted to the fixed loop and extending into the central through hole of the fixed loop to determine airflow speed information, wherein the fixed loop defines a plurality of bores in a radial direction for the anemometers extending therethrough, a plurality of screws corresponding to the bores engages in the fixed loop in an axial direction thereof to fasten the anemometers in the bores, when the screws are disengaged from the anemometers the anemometers are movable inward or outward along the bores to adjust positions of the anemometers in the central through hole of the fixed loop.

* * * * *